United States Patent [19]

Hart

[11] Patent Number: 5,152,248
[45] Date of Patent: Oct. 6, 1992

[54] ROTATABLE LIVESTOCK FEEDER WITH LOCKING CLOSURE PANEL

[76] Inventor: Richard E. Hart, Rte. 3, Box 57, Seagoville, Tex. 75159

[21] Appl. No.: 780,179

[22] Filed: Oct. 21, 1991

[51] Int. Cl.⁵ ............................................. A01K 5/01
[52] U.S. Cl. ...................................... 119/61; 119/18; 211/95
[58] Field of Search ............... 119/61, 18, 63; 211/95; 248/131, 145

[56] References Cited

U.S. PATENT DOCUMENTS

| | | |
|---|---|---|
| 157,012 | 11/1874 | Lindemann ........................... 119/18 |
| 229,540 | 7/1880 | Maetzel ................................. 119/63 |
| 476,265 | 6/1892 | Hall ....................................... 119/61 |
| 641,920 | 1/1900 | Askew . | |
| 1,639,554 | 8/1927 | Buck ..................................... 119/63 |
| 1,869,901 | 8/1932 | Le Fever ............................... 119/61 |
| 2,478,430 | 8/1949 | Stahler ................................. 119/18 |
| 2,791,984 | 5/1957 | Franklin . | |
| 3,134,360 | 5/1964 | Lewis . | |
| 3,361,116 | 1/1968 | Daniel et al. ......................... 119/18 |
| 3,468,291 | 9/1969 | Allen . | |
| 4,112,871 | 9/1978 | Newman ............................... 119/18 |

FOREIGN PATENT DOCUMENTS

| | | | |
|---|---|---|---|
| 32327 | 2/1912 | Sweden ................................. 119/63 |
| 355863 | 9/1931 | United Kingdom .................. 119/18 |

*Primary Examiner*—Gene Mancene
*Assistant Examiner*—Todd E. Manahan
*Attorney, Agent, or Firm*—Henderson & Sturm

[57] ABSTRACT

A livestock feeding apparatus (10) comprises a feeding bin unit (13) rotatably disposed relative to both the inside and outside of a stall (100). The feeding apparatus is provided with a locking unit (15) that captively engages a rotatable panel closure unit (12) bearing the feeding bin unit (13) relative to a framework unit (11) installed in the front panel (101) of the stall (100). The feeding bin unit (13) can be disposed in a captive engagement within the stall (100) by the actuation of the locking unit (15) on the outside of the stall.

1 Claim, 3 Drawing Sheets

ROTATABLE LIVESTOCK FEEDER WITH LOCKING CLOSURE PANEL

TECHNICAL FIELD

The present invention relates to livestock feeding devices in general, and in particular to a compact horse feeding device that can be operated without the necessity of entering the stall.

BACKGROUND ART

This invention was the subject matter of Document Disclosure Program Registration No. 268,658 which was filed in the untied States Patent and Trademark Office on Dec. 3, 1990.

As can be sen by reference to the following U.S. Pat. Nos. 3,134,360; 2,791,984; 3,468,291; and 641,920; the prior art is replete with myriad and diverse rotary livestock feeders designed to simplify the chore of feeding livestock.

While all of the aforementioned prior art constructions are more adequate for the basic purpose and function for which they have been specifically designed, most of these patented constructions have failed to account for the inordinate amount of space that is occupied by the quasi-circular multiple bin feeding arrangements; and only the Askew reference U.S. Pat. No. 641,920 makes any sort of accommodation for introducing feed into the feedbins in the walkway space between the stalls or pens. Unfortunately even this apparatus goes about the replenishment of feed and/or water in a very awkward manner.

As a consequence of the foregoing situation, there has existed a longstanding need among owners of livestock for a new type of quick, simple, efficient and compact livestock feeding apparatus that will allow the replenishment of both feed and water in the walkway between the stalls while only temporarily occupying that walkway space; and, the provision of such a construction is a stated objective of the present invention.

DISCLOSURE OF THE INVENTION

Briefly stated, the feeding apparatus that forms the basis of the present invention comprises in general a framework unit that is secured within an opening formed in the stall; wherein, a feeding station including a closure panel unit and a feeding bin unit are rotatably secured within the framework unit by a support unit; so that the feeding station can be manually rotated from a position inside the stall to a position outside of the stall while the feed station is replenished, and then returned to its original position within the stall to allow the livestock access to the food and water without the user having to enter the stall.

As will be explained in greater detail further on in the specification, this arrangement only temporarily occupies space in the passageway during replenishment of the individual feeding stations and provides virtually unobstructed use of the passageway when the feeding stations have been returned to their operative location within the individual stalls.

BRIEF DESCRIPTION OF THE DRAWINGS

These and other attributes of the invention will become more clear upon a thorough study of the following description of the best mode for carrying out the invention, particularly when reviewed in conjunction with the drawings, wherein.

BEST MODE FOR CARRYING OUT THE INVENTION

Figure 1:
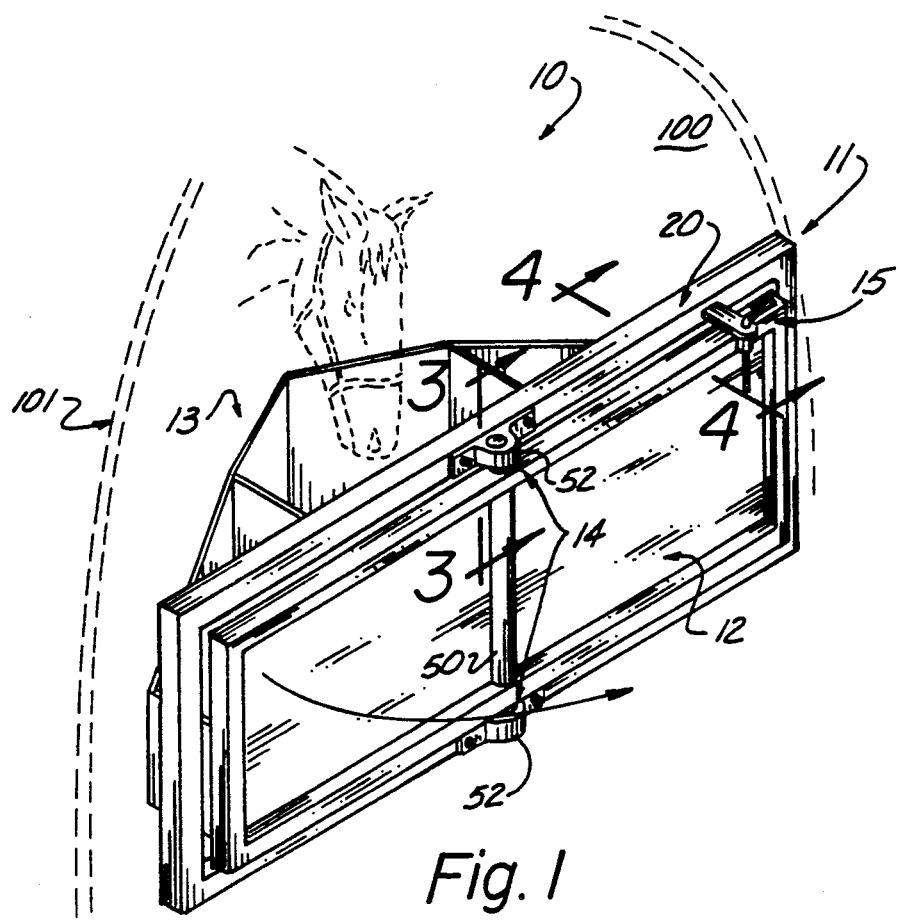
FIG. 1 is a perspective view of the livestock feeding apparatus that forms the basis of the present invention as viewed from outside the stall.

As can be seen by reference to the drawings, and in particular to FIG. 1, the livestock feeding apparatus that forms the basis of the present invention is designated generally by the reference numeral (10). The feeding apparatus (10) comprises in general a framework unit (11); a panel closure unit (12) operatively associated with a feeding bin unit (13), and rotatably suspended within the framework unit (11) by a support unit (14); and, a locking unit (15) for captively engaging the panel closure unit (12) to the framework unit (11). These units will now be described in seriatim fashion.

Figure 2:
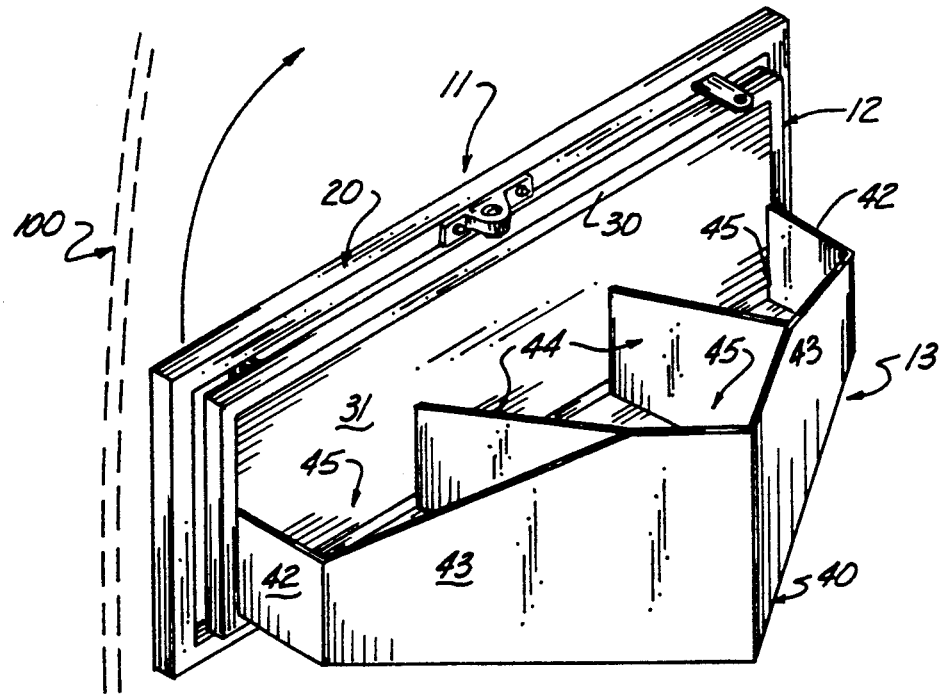
FIG. 2 is a perspective view of the livestock feeding apparatus as viewed from inside the stall.
Figure 6:
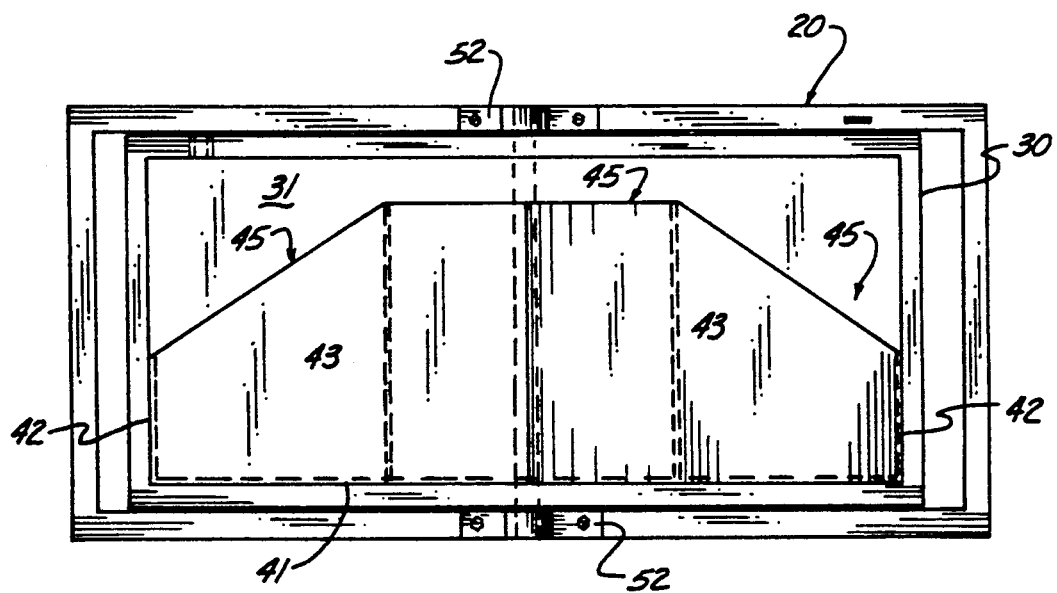
FIG. 6 is a front elevation view.

As can best be seen by reference to FIGS. 1, 2 and 6, the framework unit (11) comprises an outer generally open rectangular rigid framework member (20) securely mounted in an opening formed in the front partition panel (101) such as the gate, or wall, of a stall (100).

As can also be seen by reference to FIGS. 1, 2, and 6, the panel closure unit (12) comprises an inner generally rectangular rigid framework member (30) which is dimensioned to be rotatably received within the open framework member (20) of the framework unit (11). The inner rigid framework member (30) is further provided with a closure panel (31) which controls the opening in the first rigid framework member (20) as will be explained presently.

Figure 5:
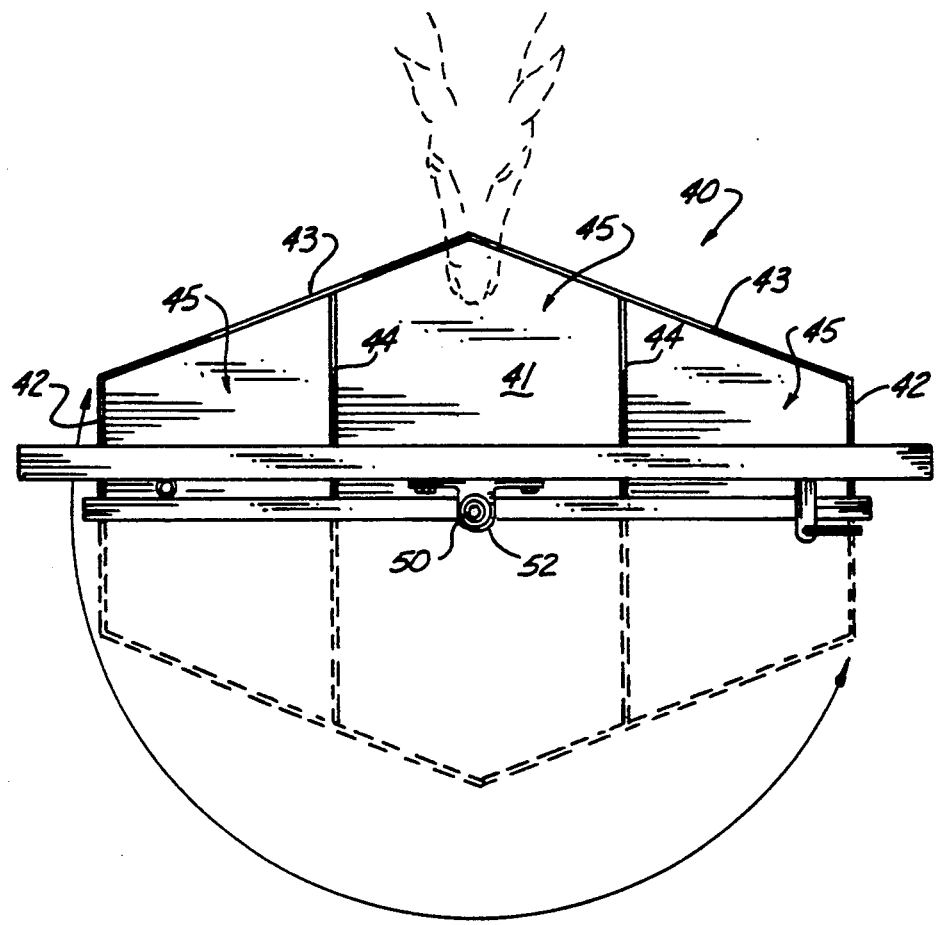
FIG. 5 is a top plan view of the apparatus.

Turning now to FIGS. 2 and 5, it can be seen that the feeding bin unit (13) comprises a compartmental feeding bin member (40) which projects outwardly from one side of the closure panel (31) and comprises in general: a floor panel (41); a pair of relatively short side walls (42) and relatively long outwardly angled front walls (43) projecting upwardly from the floor panel (41); and, a plurality of interior partitions (44), which divide the bin member (40) into a plurality of compartments (45) dimensioned to accommodate feed, hay, and water.

Figure 3:
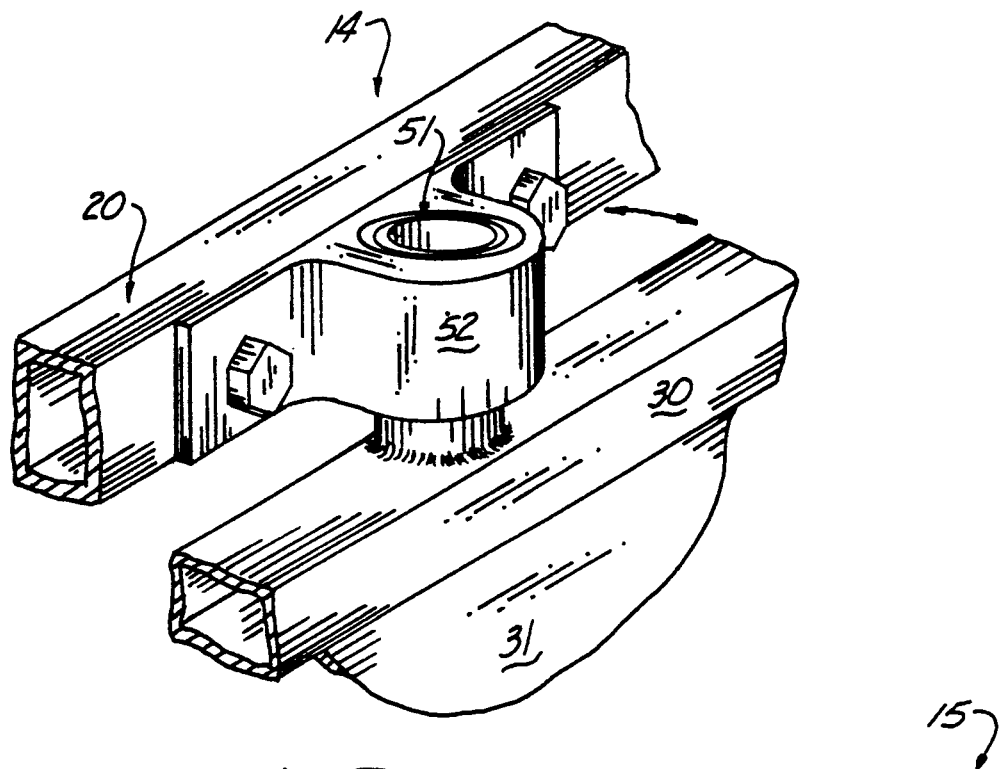
FIG. 3 is an isolated perspective view of the bearing arrangement for the apparatus.

As shown in FIGS. 1, 3 and 6, the inner framework member (30) is operably and rotatably mounted within the outer framework member (20) by the support unit (15) which comprises an axle member (50) operatively secured to the inner framework member (30) and having two axle stubs (51) which extend through and project beyond the upper and lower portions of the inner framework member (30).

In addition, each of the axle stubs (51) is, dimensioned to be received within a pair of bearing members (52) which are centrally mounted on one side of the upper and lower portions of the outer framework member (20).

Figure 4:
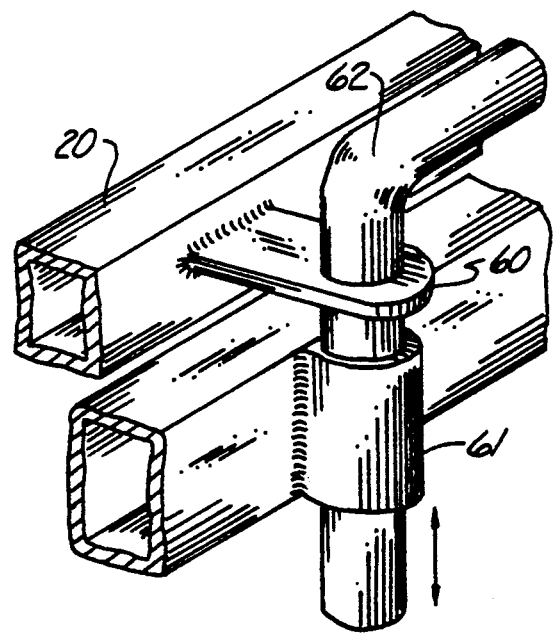
FIG. 4 is an isolated detail view of the locking arrangement for the apparatus.

As can best be seen by reference to FIGS. 1, 2, and 4, the locking unit (15) captively engages the outer framework member (20) to the inner framework member (30) and comprises in general: an elongated apertured bracket member (60) which projects outwardly from the upper portion of the outer framework member (20); a hollow cylindrical bracket member (61) which is secured to the upper portion of the inner framework member (30) wherein the apertures in both of the bracket members (60) and (61) are similarly dimensioned and capable of being brought into alignment with one another as depicted in FIGS. 1 and 4; and a generally L-shaped locking pin member (62) which is dimensioned to be received in the apertured brackets (60) and (61) when they are brought into alignment with one another.

In operation of the feeding apparatus (10), the inner framework unit (30) would be rotated to the position depicted in FIG. 2 to allow the contents of the compartments (45) to be replenished with food, hay, water and the like; then, the inner framework member (30) would be rotated back into the stall as depicted in FIGS. 1 and 5; whereupon, the locking unit (15) would be engaged to captively position the feed bins within the stall without the need of the user ever entering the stall itself.

Having thereby described the subject matter of the present invention, it should be apparent that many substitutions, modifications and variations of the invention are possible in light of the above teachings. It is therefore to be understood that the invention as taught and described herein is only to be limited to the extent of the breadth and scope of the appended claims.

I claim:

1. A livestock feeding apparatus for installation in a partition panel between a stall and a passageway; wherein the feeding apparatus comprises:

a framework unit including an enlarged, open, rectangular outer framework member mounted in an opening formed in said partition;

a closure panel unit comprising a generally rectangular inner framework member rotatably disposed in said outer framework member and provided with a closure panel;

a feeding bin unit comprising a compartmented feeding bin member which projects outwardly from one side of said closure panel;

a support unit for operably and rotatably supporting said closure panel unit within said outer framework member; wherein, the support unit comprises: a pair of axle stubs which project outwardly from the upper and lower portions of said inner framework member; and, a pair of apertured bearing members centrally disposed on one side of the upper and lower portions of said outer framework member; wherein said apertured bearing members are dimensioned to rotatably receive said axle stubs; and, locking means for captively engaging said closure panel unit relative to said outer framework member; wherein, said locking means comprises: a first elongated apertured bracket member projecting outwardly from the upper portion of the outer framework member; a second apertured cylindrical bracket member secured to the upper portion of said inner bracket member; and, a generally L-shaped locking pin dimensioned to be received in said bracket members.

* * * * *